US012341909B2

(12) United States Patent
Graves (10) Patent No.: US 12,341,909 B2
(45) Date of Patent: Jun. 24, 2025

(54) AUTHENTICATING A USER INTERACTING WITH A WIRELESS TELECOMMUNICATION NETWORK VIA A NON-INTERNET CONNECTED PHONE

(71) Applicant: T-Mobile USA, Inc., Bellevue, WA (US)

(72) Inventor: Brian Graves, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 260 days.

(21) Appl. No.: 17/975,978

(22) Filed: Oct. 28, 2022

(65) Prior Publication Data

US 2024/0146544 A1 May 2, 2024

(51) Int. Cl.
| | |
|---|---|
| H04L 9/32 | (2006.01) |
| G06Q 20/36 | (2012.01) |
| G06Q 20/38 | (2012.01) |
| G06Q 20/40 | (2012.01) |
| H04L 9/08 | (2006.01) |
| H04L 9/30 | (2006.01) |
| H04L 9/40 | (2022.01) |

(52) U.S. Cl.
CPC ....... *H04L 9/3263* (2013.01); *G06Q 20/3678* (2013.01); *G06Q 20/38215* (2013.01); *G06Q 20/3829* (2013.01); *G06Q 20/389* (2013.01); *G06Q 20/4012* (2013.01); *G06Q 20/4014* (2013.01); *H04L 9/088* (2013.01); *H04L 9/30* (2013.01); *H04L 63/083* (2013.01); *G06Q 2220/00* (2013.01)

(58) Field of Classification Search
None
See application file for complete search history.

(56) References Cited

U.S. PATENT DOCUMENTS

| | | |
|---|---|---|
| 6,393,305 B1 | 5/2002 | Ulvinen et al. |
| 7,158,776 B1 | 1/2007 | Estes et al. |
| 7,305,079 B1 | 12/2007 | Forte |
| 7,308,087 B2 | 12/2007 | Joyce et al. |
| 7,373,515 B2 | 5/2008 | Owen et al. |
| 7,565,547 B2 | 7/2009 | Matta et al. |
| 8,014,496 B2 | 9/2011 | Schultz |
| 8,082,448 B2 | 12/2011 | Vandervort |

(Continued)

FOREIGN PATENT DOCUMENTS

| | | |
|---|---|---|
| CN | 106489284 A | 3/2017 |
| CN | 107113303 A | 8/2017 |

(Continued)

*Primary Examiner* — Kaveh Abrishamkar
(74) *Attorney, Agent, or Firm* — Perkins Coie LLP (57) ABSTRACT

The system receives a call at a unique telephone number associated with a wireless telecommunication network and establishes a communication channel with a UE of a user. The system requests and receives a voice sample from the user and a PIN associated with the user. Using the voice sample and the PIN, the system performs a multi-factor authentication. Upon authenticating the user using the voice sample and the PIN, the system authorizes the user to make the modification to a blockchain. Upon failing to authenticate the user using the voice sample and the PIN, the system refuses to authorize the user to make the modification to the blockchain.

20 Claims, 7 Drawing Sheets

(56) References Cited

U.S. PATENT DOCUMENTS

| | | |
|---|---|---|
| 8,090,944 B2 | 1/2012 | Lee |
| 8,161,291 B2 | 4/2012 | Mumm et al. |
| 8,171,305 B2 | 5/2012 | Menk et al. |
| 8,225,103 B2 | 7/2012 | Chiou et al. |
| 8,233,603 B2 | 7/2012 | Forte |
| 8,321,684 B2 | 11/2012 | Mumm et al. |
| 8,351,579 B2 | 1/2013 | Jayaraman et al. |
| 8,365,258 B2 | 1/2013 | Dispensa |
| 8,379,634 B2 | 2/2013 | Bender et al. |
| 8,391,452 B2 | 3/2013 | Krantz et al. |
| 8,499,166 B2 | 7/2013 | Chiou et al. |
| 8,885,797 B2 | 11/2014 | Schultz |
| 9,083,680 B2 | 7/2015 | Marsico |
| 9,131,370 B2 | 9/2015 | Schrecker |
| 9,412,381 B2 | 8/2016 | Bhaskaran |
| 9,762,576 B2 | 9/2017 | Dispensa |
| 9,813,905 B2 | 11/2017 | Grosby |
| 9,923,885 B2 | 3/2018 | Dorfman et al. |
| 10,735,580 B2 | 8/2020 | Gallo |
| 11,297,513 B2 | 4/2022 | Agarwal et al. |
| 2002/0147658 A1 | 10/2002 | Kwan |
| 2004/0230536 A1* | 11/2004 | Fung ............... G06Q 20/382 705/64 |
| 2006/0173770 A1* | 8/2006 | McKay ............. G06Q 40/04 705/37 |
| 2006/0224470 A1 | 10/2006 | Garcia et al. |
| 2007/0125838 A1* | 6/2007 | Law .................. G07F 7/1008 705/65 |
| 2008/0195618 A1* | 8/2008 | Menk ................ H04M 3/382 707/999.009 |
| 2008/0201765 A1 | 8/2008 | Walter et al. |
| 2009/0222902 A1* | 9/2009 | Bender ............. H04L 63/0823 726/10 |
| 2010/0306154 A1* | 12/2010 | Poray .............. G06Q 30/02 707/E17.108 |
| 2011/0047605 A1 | 2/2011 | Sontag et al. |
| 2011/0213706 A1* | 9/2011 | Joshi ................. G06Q 20/40 726/1 |
| 2012/0066128 A1 | 3/2012 | Mumm et al. |
| 2012/0250584 A1 | 10/2012 | Jayaraman |
| 2012/0253810 A1 | 10/2012 | Sutton et al. |
| 2013/0006642 A1* | 1/2013 | Saxena ............. G10L 17/00 704/E17.001 |
| 2013/0124416 A1* | 5/2013 | Pawar .............. G06Q 20/10 705/44 |
| 2013/0185775 A1 | 7/2013 | Dispensa |
| 2018/0108008 A1* | 4/2018 | Chumbley ........ G06Q 20/3674 |
| 2019/0273739 A1* | 9/2019 | Pemmaraju ...... H04L 63/0884 |
| 2020/0351095 A1* | 11/2020 | Yadav .............. H04L 9/3239 |
| 2021/0084024 A1* | 3/2021 | Sadayoshi ........ H04L 63/0807 |
| 2021/0211421 A1* | 7/2021 | Shetty .............. G10L 25/84 |
| 2022/0067695 A1* | 3/2022 | Lee .................. G06Q 20/383 |
| 2022/0116231 A1* | 4/2022 | Choi ................. G05D 1/695 |

FOREIGN PATENT DOCUMENTS

| | | |
|---|---|---|
| CN | 103441984 B | 9/2017 |
| CN | 104012168 B | 6/2018 |
| CN | 108985769 A | 12/2018 |
| CN | 110753067 B | 11/2020 |
| CN | 111971706 A | 11/2020 |
| CN | 107466409 B | 11/2021 |
| CN | 109074440 B | 11/2021 |
| DE | 102007033812 B4 | 7/2009 |
| EP | 1200942 A1 | 5/2002 |
| EP | 1442555 A2 | 8/2004 |
| EP | 2356619 A1 | 8/2011 |
| EP | 2284802 B1 | 1/2013 |
| EP | 1956814 B1 | 3/2013 |
| EP | 2572498 A1 | 3/2013 |
| EP | 2191448 B1 | 4/2013 |
| EP | 3284043 A1 | 2/2018 |
| JP | H09186770 A | 7/1997 |
| JP | 3516339 B2 | 1/2004 |
| JP | 2004528624 A | 9/2004 |
| JP | 2009515232 A | 4/2009 |
| JP | 4965671 B2 | 4/2012 |
| JP | 2017525277 A | 8/2017 |
| JP | 2018521566 A | 8/2018 |
| JP | 2020520018 A | 7/2020 |
| KR | 100418113 B1 | 2/2004 |
| KR | 20060093494 A | 8/2006 |
| KR | 100621725 B1 | 9/2006 |
| KR | 20220093131 A | 7/2022 |
| WO | 0062518 A1 | 10/2000 |
| WO | 0078017 A1 | 12/2000 |
| WO | 0109851 A1 | 2/2001 |
| WO | 0223796 A1 | 3/2002 |
| WO | 03032126 A2 | 4/2003 |
| WO | 2004102446 A1 | 11/2004 |
| WO | 2005083928 A1 | 9/2005 |
| WO | 2006013555 A2 | 2/2006 |
| WO | 2006076347 A2 | 7/2006 |
| WO | 2007027641 A2 | 3/2007 |
| WO | 2007128134 A1 | 11/2007 |
| WO | 2008098839 A1 | 8/2008 |
| WO | 2009010301 A1 | 1/2009 |
| WO | 2009092105 A2 | 7/2009 |
| WO | 2010066277 A1 | 6/2010 |
| WO | 2010131988 A1 | 11/2010 |
| WO | 2011146553 A1 | 11/2011 |
| WO | 2013144669 A1 | 10/2013 |
| WO | 2016144806 A2 | 9/2016 |
| WO | 2018060327 A1 | 4/2018 |
| WO | 2018226331 A1 | 12/2018 |

* cited by examiner

AUTHENTICATING A USER INTERACTING WITH A WIRELESS TELECOMMUNICATION NETWORK VIA A NON-INTERNET CONNECTED PHONE

BACKGROUND

There are various ways to authenticate a digital user equipment (UE) and the user of the digital UE. For example, the International Mobile Equipment Identity (IMEI) identifies the phone model and serial number, whereas the international mobile subscriber identity number identifies the user. The equivalent of IMEI in a Code-Division Multiple Access cellphone is the electronic serial number or mobile equipment identifier. However, identifying the user and the device is difficult when the device is an analog phone.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system authenticates a user interacting with a wireless telecommunication network via an analog telephone. The system receives from the analog telephone—associated with the user and interacting with the wireless telecommunication network—a request to perform an operation requiring authentication. The operation requiring authentication causes a modification to a blockchain, such as a transfer of cryptocurrency, or reservation of shared resources such as processing time, memory, and/or bandwidth of the network. The system establishes a communication channel between the analog telephone and a blockchain authentication system ("authentication system") by dialing a unique telephone number associated with the wireless telecommunication network. The system requests and receives a voice sample from the user and a personal identification number (PIN) associated with the user. Upon receiving the voice sample and PIN, the system performs a multi-factor authentication by authenticating the user using the voice sample, authenticating the user using the PIN, and determining whether the voice sample and PIN are associated with a single user in a database of authorized users.

Upon authenticating the user using the voice sample and the PIN, and determining that the voice sample and the PIN are associated with the single user in the database of authorized users, the system authorizes the user to make the modification to the blockchain. Alternatively, upon failing to authenticate the user using the voice sample, failing to authenticate the user using the PIN, and/or determining that the voice sample and the PIN are not associated with the single user in the database of authorized users, the system refuses to authorize the user to make the modification to the blockchain. The system sends the status of the authorization, such as success or failure, to the wireless telecommunication network, which in turn can present the status of the authorization through a user interface to the user.

The blockchain authentication system can be a separate system from the wireless telecommunication network, or can be a part of the wireless telecommunication network. The blockchain authentication system can be operated by a third party, or can be operated by the wireless telecommunication network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
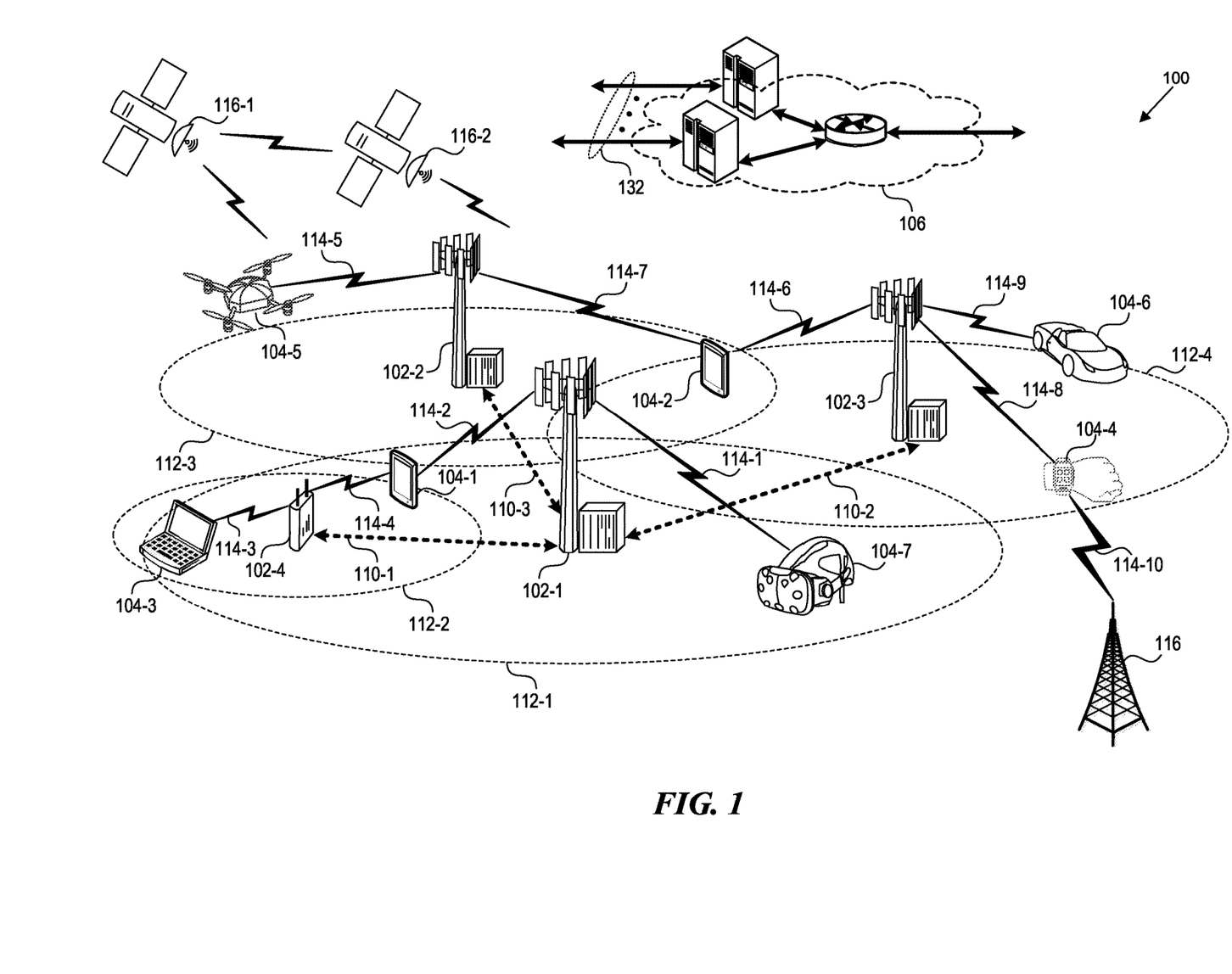
FIG. 1 is a block diagram that illustrates a wireless telecommunication network in which aspects of the disclosed technology are incorporated.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QoS) requirements and multi-terabits per second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
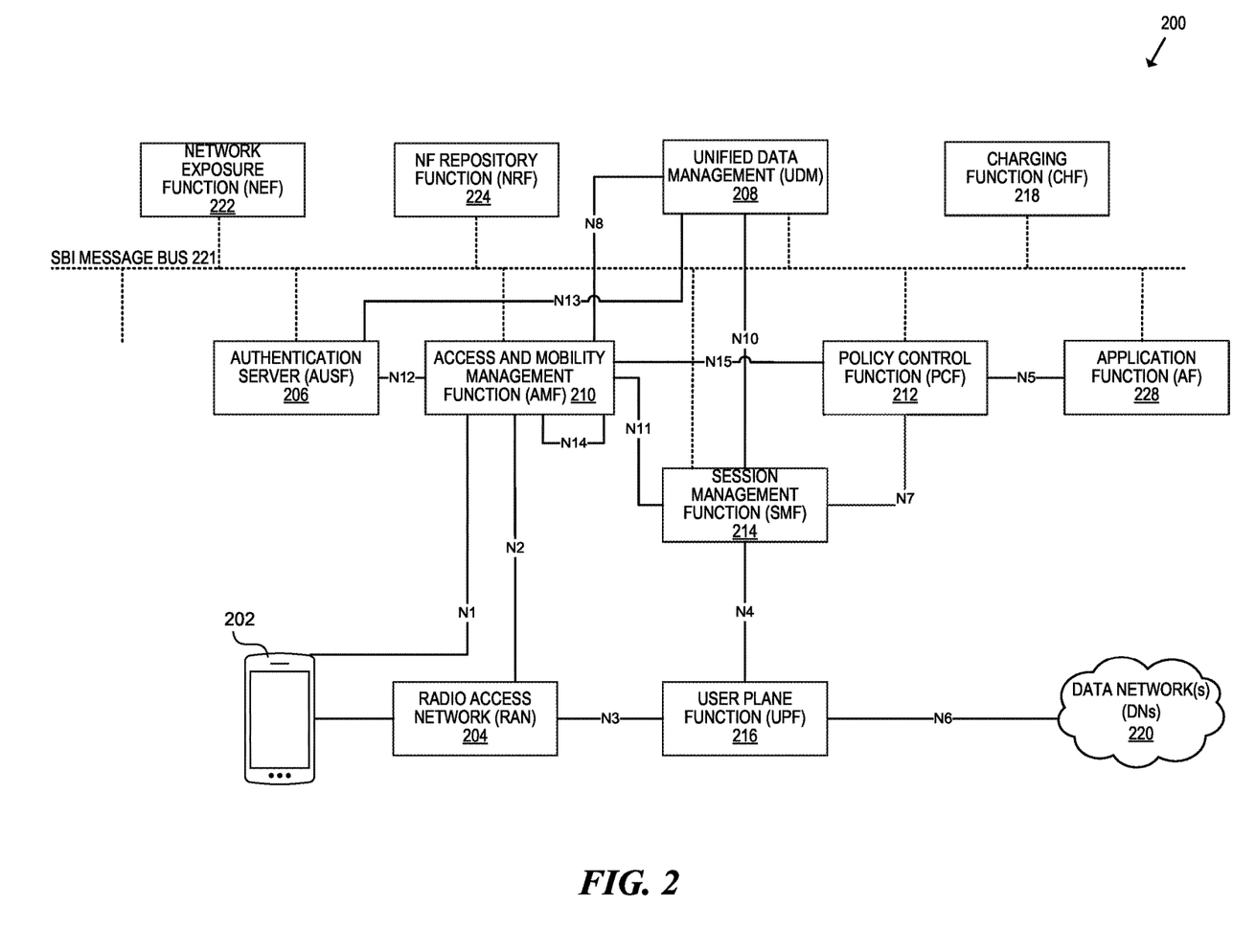
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
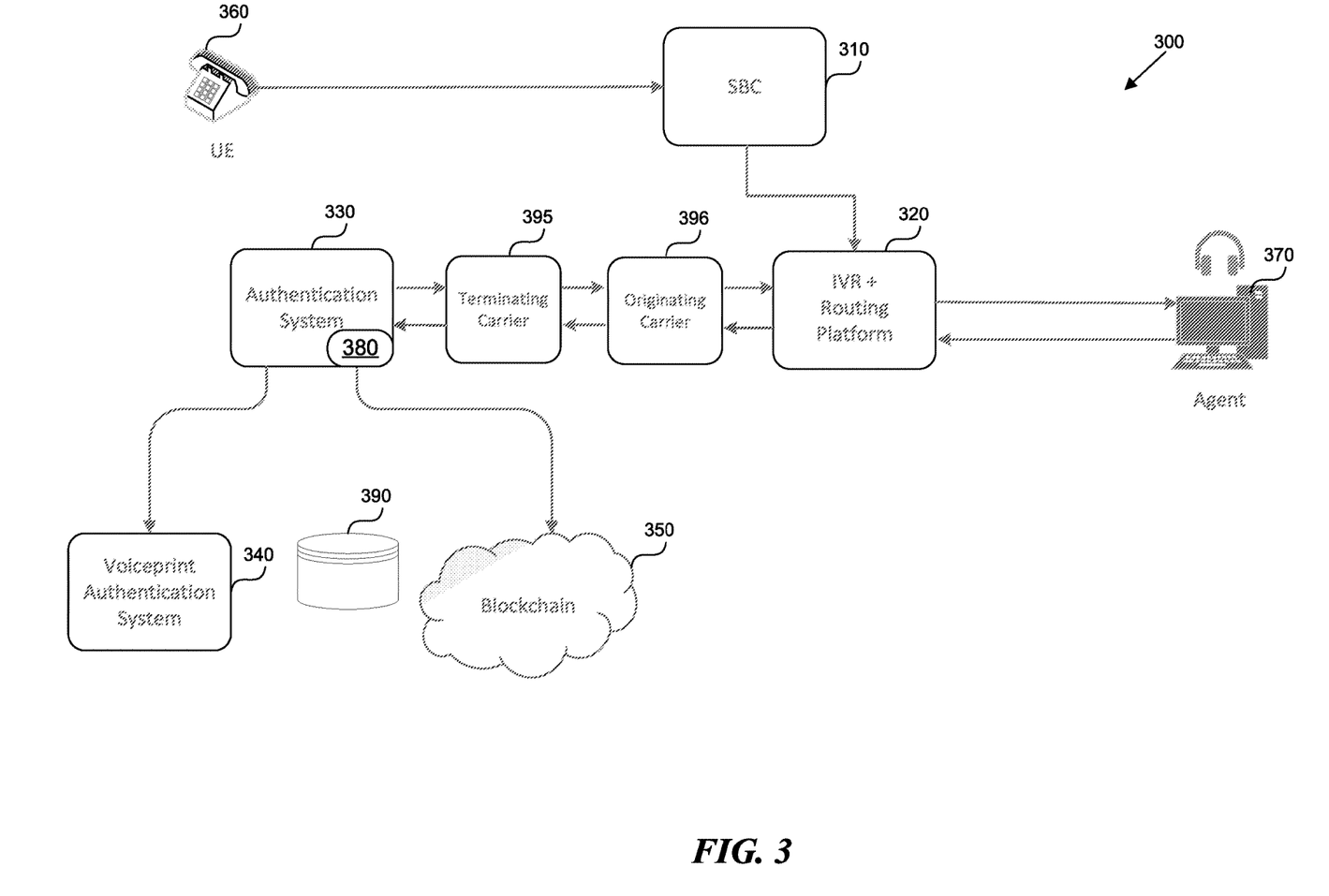
FIG. 3 shows a system to authenticate a user interacting with a wireless telecommunication network via an analog telephone.

Authenticating a User Interacting with a Wireless Telecommunication Network Via an Analog Telephone FIG. 3 shows a system to authenticate a user interacting with a wireless telecommunication network via an analog telephone. The system 300 can include session border controller (SBC) 310, interactive voice response and routing platform (IVR) 320, authentication system 330, voiceprint authentication system 340, blockchain 350, a UE 360, and optionally an agent 370.

In one embodiment, the SBC 310, the IVR 320, the authentication system 330, the voiceprint authentication system 340, and the blockchain 350 can be part of the network 100 in FIG. 1. In another embodiment, the SBC 310 and the IVR 320 are part of the network 100, while the authentication system 330, the voiceprint authentication system 340, and the blockchain 350 are part of a third-party computational system. For the system 300 to work, the connection between the IVR 320 and the authentication system 330 does not have to be a data connection, and can be a voice connection via the public switched telephone network.

The UE 360 can be a mobile device associated with the user, or can be an analog telephone. The UE 360 does not have to be connected to the Internet to utilize the disclosed system. The UE 360 does not need to be a smart phone or have Internet connectivity for the system 300 to work. In one embodiment, the agent 370 is part of the system, and can be an artificial intelligence (AI) configured to interact with the user using natural language processing. In another embodiment, the agent 370 can be integrated into the IVR 320, and the IVR 320 can interact with the user using natural language processing.

The UE 360 and the network 100 need to register with the authentication system 330, even if the authentication system 330 is part of the network. To register with the authentication system 330, the UE 360 needs to provide a voice sample of the user using the UE, a personal identification number (PIN) including a predetermined number of numeric characters, and an identifier (ID). The ID can be a wallet ID associated with the user, or can be a unique ID identifying the user within the authentication system 330. The authentication system 330 can store the voice sample, the PIN, and the wallet ID in a database 390 of authorized users.

To register with the authentication system 330, the network 100 can obtain an ID associated with the network. The ID can be a wallet ID associated with the network 100, or can be a unique ID identifying the user within the authentication system 330. Upon registering the network 100, the authentication system 330 can generate a unique telephone number 380 associated with the network. The unique telephone number 380 can be Direct Inward Dialing (DID), which is a telephone number that allows the network 100 to directly contact a specific phone at the authentication system 330 instead of going through a menu or a queue and needing to dial an extension. The unique telephone number 380 can enable the UE 360 to make a payment to the network 100.

To begin request handling by the system 300, the SBC 310 can receive a call from the UE 360. The IVR 320 can handle the call, or can deliver the call to the agent 370. The IVR 320 and/or the agent 370 can detect that the UE 360 needs to make a cryptocurrency payment to the network 100. Upon detecting that the cryptocurrency payment needs to be made, the IVR 320 or the agent 370 can transfer the call to the unique telephone number 380.

The originating carrier 396 and the terminating carrier 395 can use cryptography to ensure that the call is valid. For example, the call can include a message with an encrypted digital certificate sent over the communication channel. The originating carrier 396 can encrypt the encrypted digital certificate using a private cryptographic key associated with the network 100. When decrypted, the encrypted digital certificate can produce an identifier associated with the network 100. The terminating carrier 395 can obtain a public cryptographic key associated with the network 100. The terminating carrier 395 can check an authenticity of the message by decrypting the encrypted digital certificate using the public cryptographic key associated with the network 100. The originating carrier 396 and the terminating carrier 395 can use STIR/SHAKEN protocol to engage in originator authentication.

Once the authentication system 330 ensures that the call is valid, the authentication system can authenticate the caller using multi-factor authentication, namely the voice sample and the PIN. First, the authentication system 330 authenticates the user using the voice sample, and then authenticates the user using the PIN. The voiceprint authentication system 340 can authenticate the user's voice sample. Access to the Internet, or access to a web interface, is not required to authenticate the user. In addition, there is no need for a virtual private network; instead, a public switched telephone network can be used for authentication. The authentication system 330 can retrieve the wallet ID associated with the user from the database 390. The authentication system 330 can request the payment amount from the UE 360.

The authentication system 330 can convert the payment amount obtained from the UE 360 into the cryptocurrency value based on the value of the cryptocurrency on that day. The authentication system 330 can update the blockchain 350.

The authentication system 330 can send a dual tone multi-frequency (DTMF) sequence to indicate that payment is complete. DTMF is a telecommunication signaling system using the voice-frequency band over telephone lines between telephone equipment and other communications devices and switching centers. DTMF uses a mixture of two pure tone (pure sine wave) sounds to encode a key on a telephone keypad. The authentication system 330 can send the DTMF signal using the voice communication channel, or using the session initiation protocol (SIP) signaling channel. Successful completion of the payment can be indicated using one DTMF sequence, while failure can be indicated using a different DTMF sequence. The IVR 320 and/or the agent 370 can receive the status of the call and, based on the status code, e.g., success or failure, can respond to the user.

For example, a Cisco Unified Contact Center Enterprise (UCCE), providing Call routing and IVR 320 capability, can receive the DTMF sequence, and interpret the DTMF sequence as success or failure. The UCCE can encode the success or failure status into a call variable, which can be passed on to the agent 370 as metadata. The agent desktop can interpret the metadata and display the status of the payment. Upon receiving the status of the payment, the IVR 320 can disconnect the call to the unique telephone number 380.

In addition to recording cryptocurrency amounts, the blockchain 350 can record which user is using a shared resource, such as a workspace, a company vehicle, or computer resources available in the cloud. The computer resources can include processors, memory, bandwidth, etc. The blockchain 350 can also record code repository changes.

Figure 4:
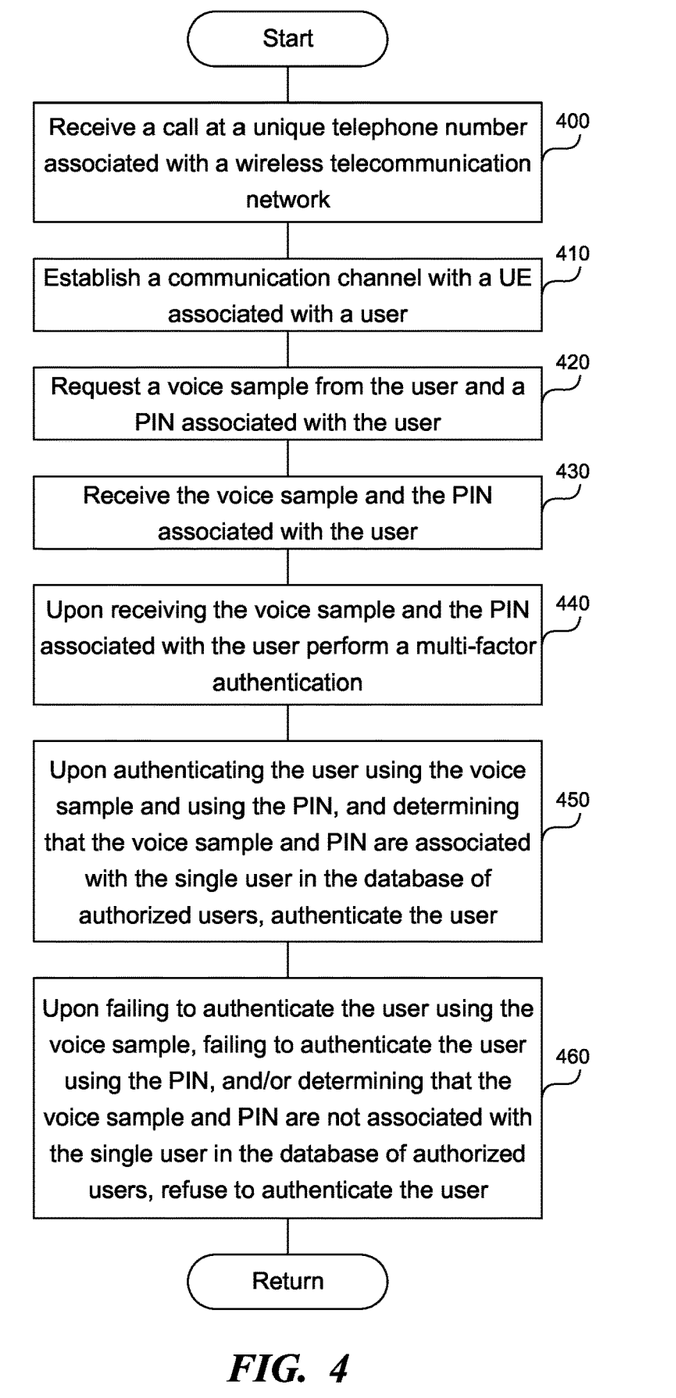
FIG. 4 is a flowchart of a method to authenticate a user interacting with a wireless telecommunication network via an analog telephone.

FIG. 4 is a flowchart of a method to authenticate a user interacting with a service provider via an analog telephone. A hardware or software processor executing instructions described in this application can receive, from the UE associated with the user and interacting with the service provider, a request to perform an operation requiring an authentication, where the operation requiring the authentication causes a modification to a blockchain. The service provider can be a wireless telecommunication network, an entity providing a public cloud, an entity providing a private cloud, etc.

In step 400, the processor can receive a call at a unique telephone number associated with the service provider. In step 410, the processor can establish a communication channel with a UE associated with a user. In step 420, the processor can request a voice sample from the user and a PIN associated with the user. In step 430, the processor can receive the voice sample and the PIN associated with the user.

In step 440, upon receiving the voice sample and the PIN associated with the user, the processor can perform a multi-factor authentication by authenticating the user using the voice sample, authenticating the user using the PIN, and determining whether the voice sample and the PIN are associated with a single user in a database of authorized users.

In step 450, upon authenticating the user using the voice sample and the PIN, and determining that the voice sample and the PIN are associated with the single user in the database of authorized users, the processor can authenticate the user and authorize the user to perform the operation on the blockchain.

In step 460, upon failing to authenticate the user using the voice sample, failing to authenticate the user using the PIN, and/or determining that the voice sample and the PIN are not associated with the single user in the database of authorized users, the processor can refuse to authenticate the user and refuse to let the user perform the operation on the blockchain. The processor can send an indication of the authentication via metadata to the service provider, which can present the indication of the authentication via a user interface of the agent.

The processor can send a request to register the service provider with the authentication system. The processor can receive from the authentication system the unique telephone number associated with the service provider. Dialing the unique telephone number associated with the service provider can enable depositing a first amount of cryptocurrency into the blockchain. The blockchain can indicate a second amount of cryptocurrency owned by the service provider.

The processor can receive a request to register the user with the authentication system. The processor can send a request to the user for a second voice sample and the PIN. The second voice sample can be the same as or different from the voice sample. For example, the user can speak a particular word to be authenticated, or the user can utter any phrase to be authenticated. The processor can receive the second voice sample and the PIN. The processor can store the second voice sample and the PIN in the database of authorized users.

The processor can use STIR/SHAKEN between originating and terminating carriers for basic originator authentication. For example, an originating carrier can create an encrypted digital certificate to a message sent over the communication channel, where the encrypted digital certificate is encrypted using a private cryptographic key associated with the service provider. The encrypted digital certificate can indicate an identifier associated with the service provider. A terminating carrier can cause the authentication system to obtain a public cryptographic key associated with the service provider. The terminating carrier can cause the authentication system to check an authenticity of the message by decrypting the encrypted digital certificate using the public cryptographic key associated with the service provider.

The processor can receive a request to register the user with the authentication system. The processor can send a request to the user for the second voice sample, the PIN, and a wallet ID associated with the user, where the wallet ID indicates an amount of cryptocurrency associated with the user. The processor can receive the second voice sample, the PIN, and the wallet ID associated with the user. The processor can store the second voice sample, the PIN, and the wallet ID associated with the user in the database of authorized users. Upon authenticating the user using the second voice sample and the PIN, the processor can retrieve the wallet ID associated with the second voice sample and the PIN from the database of authorized users.

The processor can receive a request to register the user with the authentication system. The processor can send a request to the user for the second voice sample, the PIN, and a wallet ID associated with the user. The processor can receive the second voice sample, the PIN, and the wallet ID associated with the user. The processor can store the second voice sample, the PIN, and the wallet ID associated with the user in the database of authorized users, where the wallet ID indicates an amount of cryptocurrency associated with the user. Upon authenticating the user using the second voice sample and the PIN, the processor can retrieve the wallet ID associated with the second voice sample and the PIN from the database of authorized users. The user does not need to type in the wallet ID because the wallet ID can be very long, for example, over 40 characters. Consequently, the processor retrieves the wallet ID. The processor can receive a request to register the service provider with the authentication system. The processor can send a second request to the service provider for a wallet ID associated with the service provider. The processor can receive the wallet ID associated with the service provider. The processor can generate the unique telephone number associated with the service provider. Dialing the unique telephone number associated with the service provider enables depositing a first amount of cryptocurrency into the blockchain. The blockchain can indicate a second amount of cryptocurrency owned by the service provider. Upon receiving a call at the unique telephone number, the processor can receive an indication of the first amount of cryptocurrency via the communication channel. The processor can make a record in the blockchain transferring the first amount of cryptocurrency to the wallet ID associated with the service provider.

The processor can send a DTMF sequence to indicate that payment is complete (one sequence for success and another for failure) and the call leg can be terminated. DTMF transmission can be either in-band or out of band. The processor can use metadata to indicate success or failure to the agent through an agent user interface. The processor can send a DTMF sequence to the service provider indicating that the operation requiring the authentication is complete, where a first sequence of DTMF indicates success, and where a second sequence of DTMF indicates failure. The processor can disconnect the communication channel. The processor can cause the service provider to determine whether the first sequence of DTMF or the second sequence of DTMF is sent. The processor can cause the call routing platform to provide an indication of success to the user upon determining that the first sequence of DTMF was sent. The processor can cause the call routing platform to provide an indication of failure to the user upon determining that the second sequence of DTMF was sent.

The processor can request compute resources, such as processor time, memory, bandwidth, etc., via the blockchain. The processor can receive a request to register the user with the authentication system. The processor can send a request to the user for the second voice sample, the PIN, and an ID associated with the user. The processor can receive the second voice sample, the PIN, and the ID associated with the user. The processor can store the second voice sample, the PIN, and the ID associated with the user in the database of authorized users. Upon authenticating the user using the second voice sample and the PIN, the processor can retrieve the ID associated with the second voice sample and the PIN from the database of authorized users. The processor can receive a request to register the service provider with the authentication system. The processor can send a second request to the service provider for an ID associated with the service provider. The processor can receive the ID associated with the service provider. The processor can generate the unique telephone number associated with the service provider. Dialing the unique telephone number associated with the service provider enables the user to request a computational resource associated with the service provider. The blockchain can indicate available computational resources associated with the service provider. Upon receiving a call at the unique telephone number, the processor can receive an indication of the computational resource via the communication channel. The processor can allocate the computational resource to the user. The processor can make a record in the blockchain indicating that the computational resource is being used by the user.

Figure 5A:
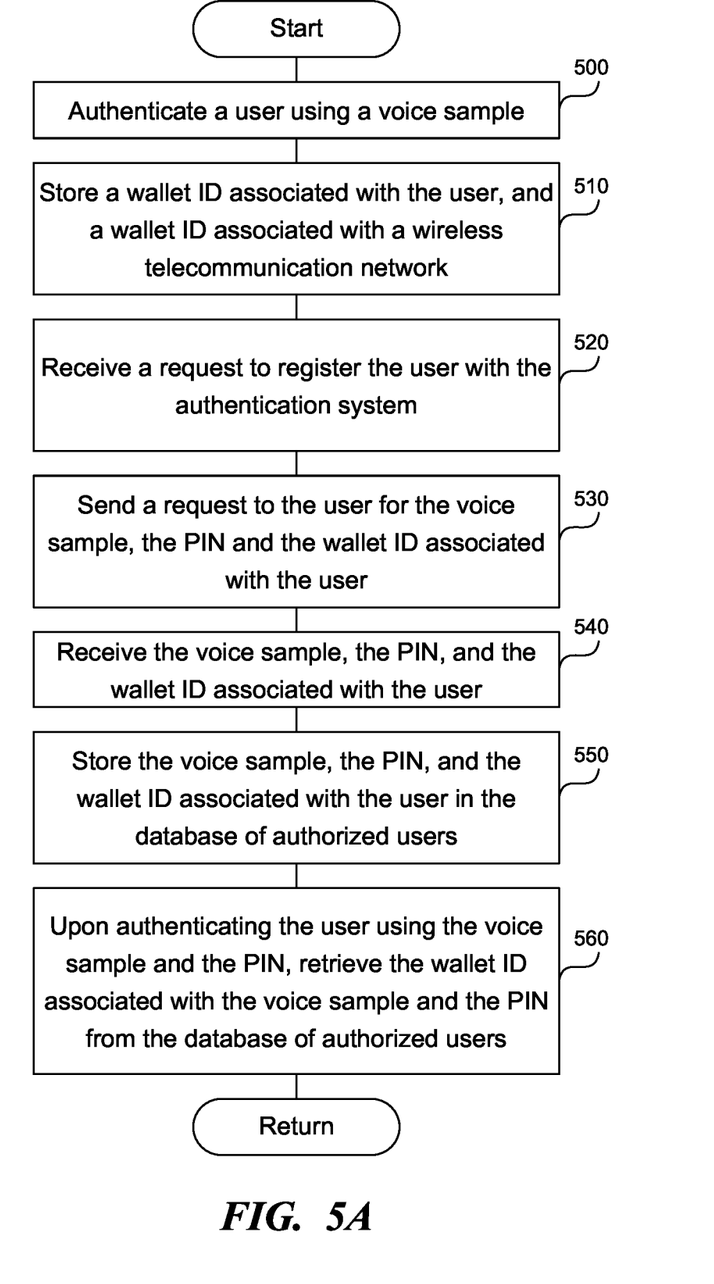
FIGS. 5A-5B show steps the system can take to make a record in a blockchain.
Figure 5B:
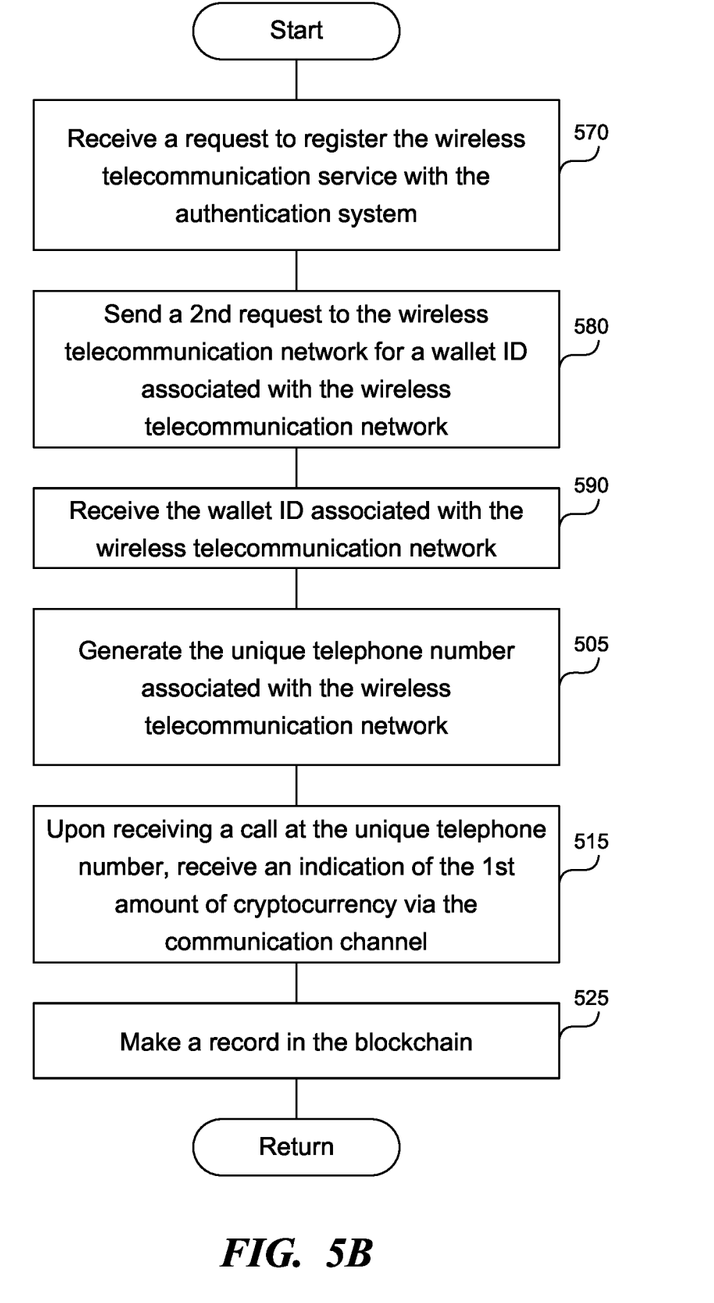

FIGS. 5A-5B show steps the system can take to make a record in a blockchain. In step 500, a voiceprint blockchain authentication system can authenticate a user using a voice sample. In step 510, a blockchain can store a wallet ID associated with the user and a wallet ID associated with a wireless telecommunication network. The wallet ID associated with the user indicates an amount of cryptocurrency available to the user, and the wallet ID associated with the wireless telecommunication network indicates an amount of cryptocurrency available to the wireless telecommunication network.

In step 520, a blockchain authentication system can receive a request to register the user with the blockchain authentication system. In step 530, the blockchain authentication system can send a request to the user for the voice sample, the PIN, and the wallet ID associated with the user. In step 540, the blockchain authentication system can receive the voice sample, the PIN, and the wallet ID associated with the user. In step 550, the blockchain authentication system can store the voice sample, the PIN, and the wallet ID associated with the user in the database of authorized users, where the wallet ID indicates an amount of cryptocurrency associated with the user. In step 560, upon authenticating the user using the voice sample and the PIN, the blockchain authentication system can retrieve the wallet ID associated with the voice sample and the PIN from the database of authorized users. In step 570, the blockchain authentication system can receive a request to register the wireless telecommunication network with the blockchain authentication system. In step 580, the blockchain authentication system can send a second request to the wireless telecommunication network for a wallet ID associated with the wireless telecommunication network. In step 590, the blockchain authentication system can receive the wallet ID associated with the wireless telecommunication network.

In step 505, the blockchain authentication system can generate the unique telephone number associated with the wireless telecommunication network, where dialing the unique telephone number associated with the wireless telecommunication network enables depositing a first amount of cryptocurrency into the blockchain. The blockchain indicates a second amount of cryptocurrency owned by the wireless telecommunication network.

In step 515, upon receiving a call at the unique telephone number, the blockchain authentication system can receive an indication of the first amount of cryptocurrency via the communication channel. In step 525, the blockchain authentication system can make a record in the blockchain transferring the first amount of cryptocurrency to the wallet ID associated with the wireless telecommunication network.

The blockchain authentication system can use STIR/SHAKEN between originating and terminating carriers for basic originator authentication. The blockchain authentication system can obtain a message including an encrypted digital certificate to a message from a wireless telecommunication network. The encrypted digital certificate is encrypted using a private cryptographic key associated with the wireless telecommunication network. The encrypted digital certificate indicates an identifier associated with the wireless telecommunication network. The encrypted communication can be carried via SIP as an encrypted certificate attached to the SIP header. The blockchain authentication system can receive a public cryptographic key associated with the wireless telecommunication network. The blockchain authentication system can verify an authenticity of the message by decrypting the encrypted digital certificate using the public cryptographic key associated with the wireless telecommunication network.

The blockchain authentication system can send a DTMF sequence to indicate that payment is complete (one sequence for success and another for failure) and can terminate the call. The routing platform drops the payment leg and reconnects the caller with the agent. The agent desktop displays the status of the payment, for example, success or failure. Instead of DTMF, the blockchain authentication system can also send a SIP message and encode the success/failure indicator in the metadata of the SIP message. The blockchain authentication system can send a DTMF sequence to the wireless telecommunication network indicating that the operation requiring the authentication is complete, where a first sequence of DTMF indicates success, and where a second sequence of DTMF indicates failure. The blockchain authentication system can disconnect the communication channel. The blockchain authentication system can cause a customer service call routing platform to determine whether the first sequence of DTMF or the second sequence of DTMF is sent. The blockchain authentication system can cause the customer service call routing platform to provide an indication of success to the user upon determining that the first sequence of DTMF was sent, and to provide an indication of failure to the user upon determining that the second sequence of DTMF was sent.

The blockchain authentication system can request computational resources via the blockchain. The user will register with the blockchain authentication system and input a voice sample, PIN and unique ID. The blockchain authentication system can receive the voice sample, the PIN, and the ID associated with the user. The blockchain authentication system can store the voice sample, the PIN, and the ID associated with the user in the database of authorized users. Upon authenticating the user using the voice sample and the PIN, the blockchain authentication system can retrieve the ID associated with the voice sample and the PIN from the database of authorized users. The wireless telecommunication network will register with the blockchain authentication system and input an ID associated with the wireless telecommunication network. The blockchain authentication system can receive the ID associated with the wireless telecommunication network. The blockchain authentication system can generate the unique telephone number associated with the wireless telecommunication network. Dialing the unique telephone number associated with the wireless telecommunication network enables the user to request a computational resource associated with the wireless telecommunication network. The blockchain indicates available computational resources such as processing time, memory, bandwidth, etc., associated with the wireless telecommunication network. Upon receiving a call at the unique telephone number, the blockchain authentication system can receive an indication of the computational resource via the communication channel. The blockchain authentication system can allocate the computational resource to the user. The blockchain authentication system can make a record in the blockchain indicating that the computational resource is being used by the user.

Computer System

Figure 6:
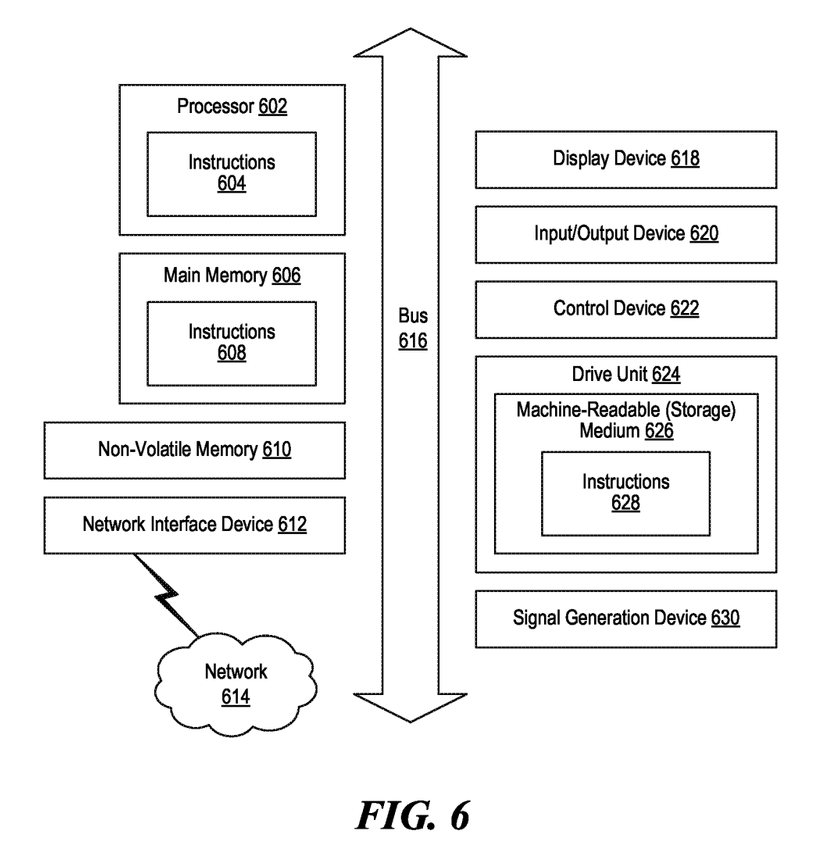
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system, or a distributed system such as a mesh of computer systems, or the computer system 600 can include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system to make a record in a blockchain, comprising:
   a voiceprint blockchain authentication system configured to authenticate a user using a voice sample;
   a blockchain configured to store a wallet identifier (ID) associated with the user, and a wallet ID associated with a service provider,
      wherein the wallet ID associated with the user indicates an amount of cryptocurrency available to the user,
      wherein the wallet ID associated with the service provider indicates an amount of cryptocurrency available to the service provider;
   a blockchain authentication system configured to:
      receive a request to register the user with the blockchain authentication system;
      send a request to the user for the voice sample, a PIN, and the wallet ID associated with the user;
      receive the voice sample, the PIN, and the wallet ID associated with the user;
      store the voice sample, the PIN, and the wallet ID associated with the user in a database of authorized users,
         wherein the wallet ID indicates an amount of cryptocurrency associated with the user;
      upon authenticating the user using the voice sample and the PIN, retrieve the wallet ID associated with the voice sample and the PIN from the database of authorized users;
      receive a request to register the service provider with the blockchain authentication system;
      send a second request to the service provider for a wallet ID associated with the service provider;
      receive the wallet ID associated with the service provider;
      generate a unique telephone number associated with the service provider,
         wherein dialing the unique telephone number associated with the service provider enables depositing a first amount of cryptocurrency into the blockchain,
         wherein the blockchain indicates a second amount of cryptocurrency owned by the service provider;
      upon receiving a call at the unique telephone number, receive an indication of the first amount of cryptocurrency; and
      make a record in the blockchain transferring the first amount of cryptocurrency to the wallet ID associated with the service provider.

2. The system of claim 1, wherein the blockchain authentication system is configured to:

obtain a message including an encrypted digital certificate associated with a service provider,
wherein the encrypted digital certificate is encrypted using a private cryptographic key associated with the service provider,
wherein the encrypted digital certificate indicates an identifier associated with the service provider;
receive a public cryptographic key associated with the service provider; and
verify an authenticity of the message by decrypting the encrypted digital certificate using the public cryptographic key associated with the service provider.

3. The system of claim 1, wherein the blockchain authentication system is configured to:
send a dual tone multi-frequency (DTMF) sequence to the service provider indicating that an operation requiring an authentication is complete,
wherein a first sequence of DTMF indicates success,
wherein a second sequence of DTMF indicates failure;
cause the service provider to determine whether the first sequence of DTMF or the second sequence of DTMF is sent;
cause the service provider to provide an indication of success to the user upon determining that the first sequence of DTMF was sent; and
cause the service provider to provide an indication of failure to the user upon determining that the second sequence of DTMF was sent.

4. The system of claim 1, wherein the blockchain authentication system is configured to:
send a request to the user for the voice sample, the PIN, and an ID associated with the user;
receive the voice sample, the PIN, and the ID associated with the user;
store the voice sample, the PIN, and the ID associated with the user in the database of authorized users;
upon authenticating the user using the voice sample and the PIN, retrieve the ID associated with the voice sample and the PIN from the database of authorized users;
send a second request to the service provider for an ID associated with the service provider;
receive the ID associated with the service provider;
generate the unique telephone number associated with the service provider,
wherein dialing the unique telephone number associated with the service provider enables the user to request a computational resource associated with the service provider, and
wherein the blockchain indicates available computational resources associated with the service provider;
upon receiving a call at the unique telephone number, receive an indication of the computational resource;
allocate the computational resource to the user; and
make a record in the blockchain indicating that the computational resource is being used by the user.

5. A method to make a record in a blockchain, the method comprising:
authenticating, by a voiceprint blockchain authentication system, a user using a voice sample;
storing, by a blockchain, a wallet identifier (ID) associated with the user and a wallet ID associated with a service provider,
wherein the wallet ID associated with the user indicates an amount of cryptocurrency available to the user,
wherein the wallet ID associated with the service provider indicates an amount of cryptocurrency available to the service provider;
receiving, by a blockchain authentication system, a request to register the user with the blockchain authentication system;
sending, by the blockchain authentication system, a request to the user for the voice sample, a PIN, and the wallet ID associated with the user;
receiving, by the blockchain authentication system, the voice sample, the PIN, and the wallet ID associated with the user;
storing, by the blockchain authentication system, the voice sample, the PIN, and the wallet ID associated with the user in a database of authorized users,
wherein the wallet ID indicates an amount of cryptocurrency associated with the user;
retrieving, by the blockchain authentication system, upon authenticating the user using the voice sample and the PIN, the wallet ID associated with the voice sample and the PIN from the database of authorized users;
receiving, by the blockchain authentication system, a request to register the service provider with the blockchain authentication system;
sending, by the blockchain authentication system, a second request to the service provider for a wallet ID associated with the service provider;
receiving, by the blockchain authentication system, the wallet ID associated with the service provider;
generating, by the blockchain authentication system, a unique telephone number associated with the service provider,
wherein dialing the unique telephone number associated with the service provider enables depositing a first amount of cryptocurrency into the blockchain,
wherein the blockchain indicates a second amount of cryptocurrency owned by the service provider;
receiving, by the blockchain authentication system, upon receiving a call at the unique telephone number, an indication of the first amount of cryptocurrency; and
making a record, by the blockchain authentication system, in the blockchain transferring the first amount of cryptocurrency to the wallet ID associated with the service provider.

6. The method of claim 5, further comprising:
obtaining, by the blockchain authentication system, a message including an encrypted digital certificate associated with a service provider,
wherein the encrypted digital certificate is encrypted using a private cryptographic key associated with the service provider, and
wherein the encrypted digital certificate indicates an identifier associated with the service provider.

7. The method of claim 6, further comprising:
receiving, by the blockchain authentication system, a public cryptographic key associated with the service provider; and
verifying, by the blockchain authentication system, an authenticity of the message by decrypting the encrypted digital certificate using the public cryptographic key associated with the service provider.

8. The method of claim 5, further comprising: wherein the blockchain authentication system is configured to:
sending, by the blockchain authentication system, a dual tone multi-frequency (DTMF) sequence to the service provider indicating that an operation requiring an authentication is complete, wherein a first sequence of DTMF indicates success, wherein a second sequence of DTMF indicates failure;

causing, by the blockchain authentication system, the service provider to determine whether the first sequence of DTMF or the second sequence of DTMF is sent;

causing, by the blockchain authentication system, the service provider to provide an indication of success to the user upon determining that the first sequence of DTMF was sent; and causing, by the blockchain authentication system, the service provider to provide an indication of failure to the user upon determining that the second sequence of DTMF was sent.

9. The method of claim 5, further comprising:

sending, by the blockchain authentication system, a request to the user for the voice sample, the PIN, and an ID associated with the user;

receiving, by the blockchain authentication system, the voice sample, the PIN, and the ID associated with the user; and storing, by the blockchain authentication system, the voice sample, the PIN, and the ID associated with the user in the database of authorized users.

10. The method of claim 9, further comprising;

retrieving, by the blockchain authentication system, upon authenticating the user using the voice sample and the PIN, the ID associated with the voice sample and the PIN from the database of authorized users;

sending, by the blockchain authentication system, a second request to the service provider for an ID associated with the service provider;

receiving, by the blockchain authentication system, the ID associated with the service provider; and generating, by the blockchain authentication system, the unique telephone number associated with the service provider, wherein dialing the unique telephone number associated with the service provider enables the user to request a computational resource associated with the service provider, and wherein the blockchain indicates available computational resources associated with the service provider.

11. The method of claim 10, further comprising:

receiving, by the blockchain authentication system, upon receiving a call at the unique telephone number, an indication of the computational resource;

allocating, by the blockchain authentication system, the computational resource to the user; and making a record, by the blockchain authentication system, in the blockchain indicating that the computational resource is being used by the user.

12. The method of claim 5, further comprising:

receiving, by the blockchain authentication system, a request to register the user with the blockchain authentication system;

sending, by the blockchain authentication system, a request to the user for a second voice sample, the PIN, and a wallet ID associated with the user, wherein the wallet ID indicates an amount of cryptocurrency associated with the user;

receiving, by the blockchain authentication system, the second voice sample, the PIN, and the wallet ID associated with the user;

storing, by the blockchain authentication system, the second voice sample, the PIN, and the wallet ID associated with the user in the database of authorized users; and retrieving, by the blockchain authentication system, upon authenticating the use using the second voice sample and the PIN, the wallet ID associated with the second voice sample and the PIN from the database of authorized users.

13. At least one non-transitory computer-readable storage medium storing instructions to make a record in a blockchain, which, when executed by at least one data processor of a system, cause the system to:

authenticate, by a voiceprint blockchain authentication system, a user using a voice sample;

store, by a blockchain, a wallet identifier (ID) associated with the user and a wallet ID associated with a service provider, wherein the wallet ID associated with the user indicates an amount of cryptocurrency available to the user, wherein the wallet ID associated with the service provider indicates an amount of cryptocurrency available to the service provider;

receive, by a blockchain authentication system, a request to register the user with the blockchain authentication system;

send, by the blockchain authentication system, a request to the user for the voice sample, a PIN, and the wallet ID associated with the user;

receive, by the blockchain authentication system, the voice sample, the PIN, and the wallet ID associated with the user;

store, by the blockchain authentication system, the voice sample, the PIN, and the wallet ID associated with the user in a database of authorized users, wherein the wallet ID indicates an amount of cryptocurrency associated with the user;

retrieve, by the blockchain authentication system, upon authenticating the user using the voice sample and the PIN, the wallet ID associated with the voice sample and the PIN from the database of authorized users;

receive, by the blockchain authentication system, a request to register the service provider with the blockchain authentication system;

send, by the blockchain authentication system, a second request to the service provider for a wallet ID associated with the service provider;

receive, by the blockchain authentication system, the wallet ID associated with the service provider;

generate, by the blockchain authentication system, a unique telephone number associated with the service provider, wherein dialing the unique telephone number associated with the service provider enables depositing a first amount of cryptocurrency into the blockchain, wherein the blockchain indicates a second amount of cryptocurrency owned by the service provider;

receive, by the blockchain authentication system, upon receiving a call at the unique telephone number, an indication of the first amount of cryptocurrency; and make a record, by the blockchain authentication system, in the blockchain transferring the first amount of cryptocurrency to the wallet ID associated with the service provider.

14. The at least one non-transitory computer-readable storage medium of claim 13, comprising instruction to:

obtain, by the blockchain authentication system, a message including an encrypted digital certificate associated with a service provider,
  wherein the encrypted digital certificate is encrypted using a private cryptographic key associated with the service provider, and
  wherein the encrypted digital certificate indicates an identifier associated with the service provider.

15. The at least one non-transitory computer-readable storage medium of claim 14, comprising instruction to:
  receive, by the blockchain authentication system, a public cryptographic key associated with the service provider; and
  verify, by the blockchain authentication system, an authenticity of the message by decrypting the encrypted digital certificate using the public cryptographic key associated with the service provider.

16. The at least one non-transitory computer-readable storage medium of claim 13, comprising instruction to:
  send, by the blockchain authentication system, a dual tone multi-frequency (DTMF) sequence to the service provider indicating that an operation requiring an authentication is complete,
    wherein a first sequence of DTMF indicates success, wherein a second sequence of DTMF indicates failure;
  cause, by the blockchain authentication system, the service provider to determine whether the first sequence of DTMF or the second sequence of DTMF is sent;
  cause, by the blockchain authentication system, the service provider to provide an indication of success to the user upon determining that the first sequence of DTMF was sent; and
  cause, by the blockchain authentication system, the service provider to provide an indication of failure to the user upon determining that the second sequence of DTMF was sent.

17. The at least one non-transitory computer-readable storage medium of claim 13, comprising instruction to:
  send, by the blockchain authentication system, a request to the user for the voice sample, the PIN, and an ID associated with the user;
  receive, by the blockchain authentication system, the voice sample, the PIN, and the ID associated with the user; and
  store, by the blockchain authentication system, the voice sample, the PIN, and the ID associated with the user in the database of authorized users.

18. The at least one non-transitory computer-readable storage medium of claim 17, comprising instruction to:
  retrieve, by the blockchain authentication system, upon authenticating the user using the voice sample and the PIN, the ID associated with the voice sample and the PIN from the database of authorized users;
  send, by the blockchain authentication system, a second request to the service provider for an ID associated with the service provider;
  receive, by the blockchain authentication system, the ID associated with the service provider; and
  generate, by the blockchain authentication system, the unique telephone number associated with the service provider,
    wherein dialing the unique telephone number associated with the service provider enables the user to request a computational resource associated with the service provider, and
    wherein the blockchain indicates available computational resources associated with the service provider.

19. The at least one non-transitory computer-readable storage medium of claim 18, comprising instruction to:
  receive, by the blockchain authentication system, upon receiving a call at the unique telephone number, an indication of the computational resource;
  allocate, by the blockchain authentication system, the computational resource to the user; and
  make a record, by the blockchain authentication system, in the blockchain indicating that the computational resource is being used by the user.

20. The at least one non-transitory computer-readable storage medium of claim 13, comprising instruction to:
  receive, by the blockchain authentication system, a request to register the user with the blockchain authentication system;
  send, by the blockchain authentication system, a request to the user for a second voice sample, the PIN, and a wallet ID associated with the user,
    wherein the wallet ID indicates an amount of cryptocurrency associated with the user;
  receive, by the blockchain authentication system, the second voice sample, the PIN, and the wallet ID associated with the user;
  store, by the blockchain authentication system, the second voice sample, the PIN, and the wallet ID associated with the user in the database of authorized users; and
  retrieve, by the blockchain authentication system, upon authenticating the use using the second voice sample and the PIN, the wallet ID associated with the second voice sample and the PIN from the database of authorized users.

* * * * *